June 5, 1951  C. ADLER, JR  2,556,052
DIVERTER LIGHTING SYSTEM
Filed Oct. 16, 1950  2 Sheets-Sheet 1
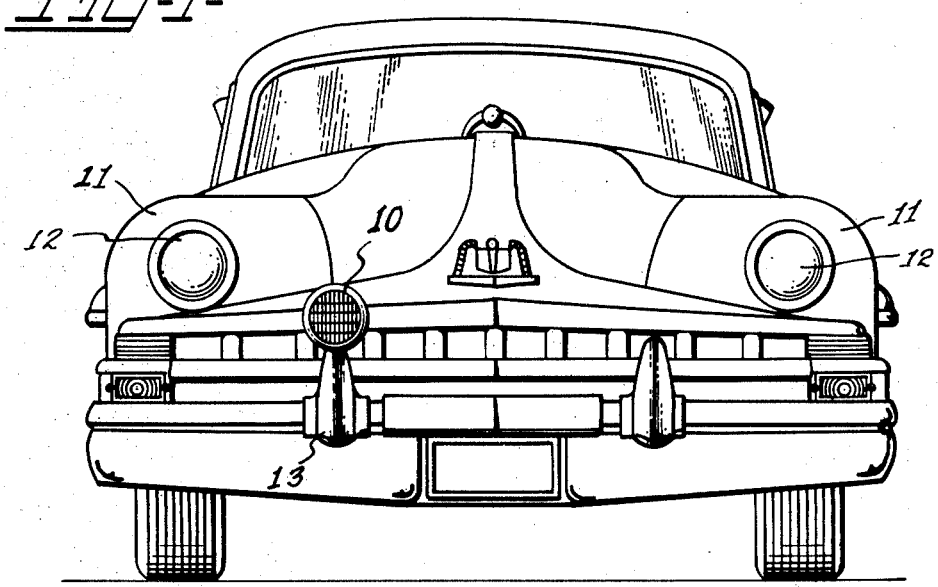
FIG-1-
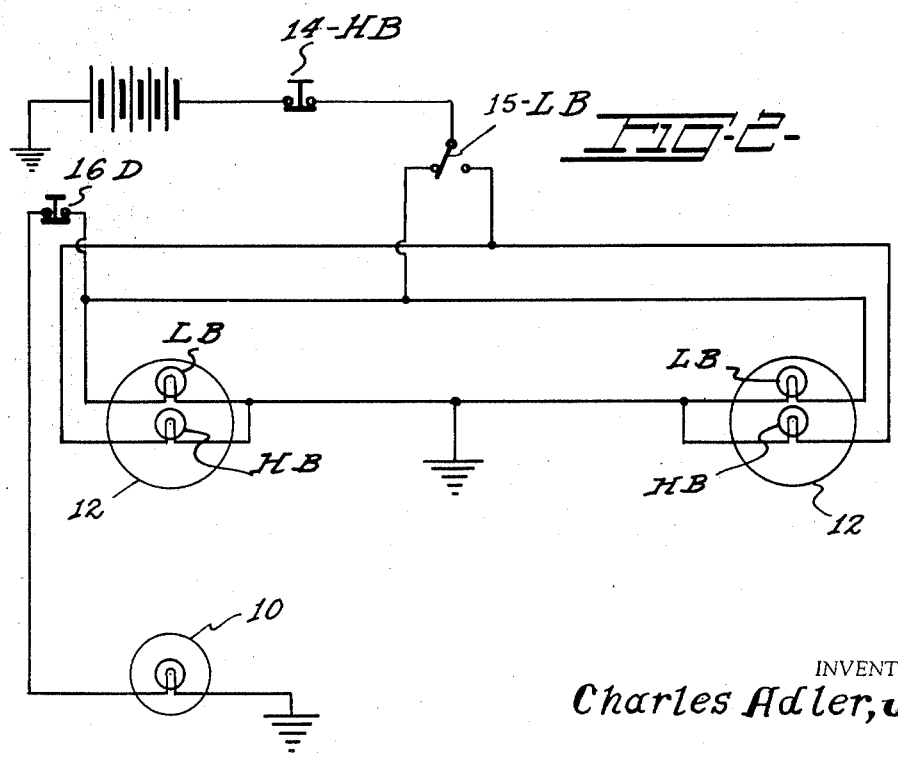
FIG-2-
INVENTOR
Charles Adler, Jr.
BY Cushman, Darby & Cushman
ATTORNEY June 5, 1951 C. ADLER, JR 2,556,052
DIVERTER LIGHTING SYSTEM
Filed Oct. 16, 1950 2 Sheets—Sheet 2
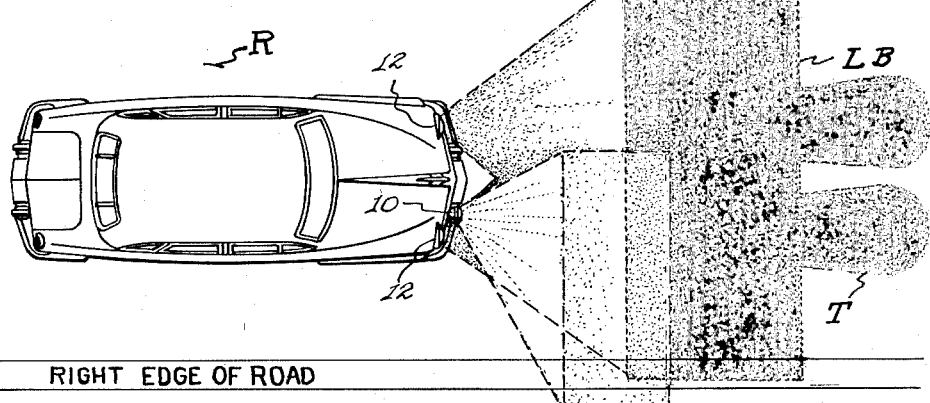
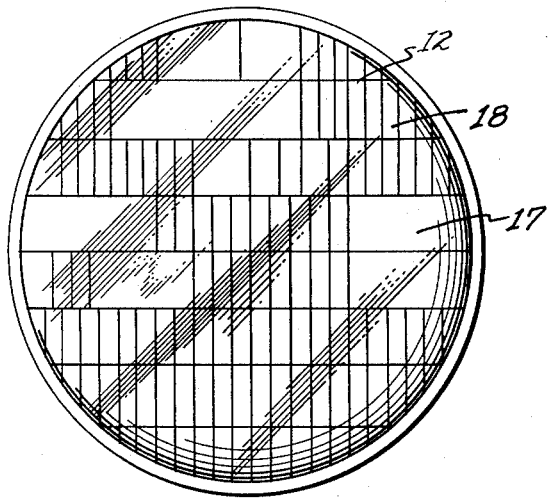
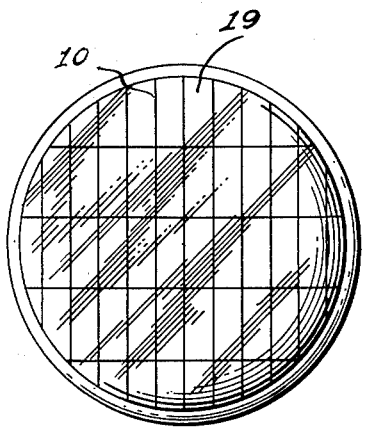
INVENTOR
Charles Adler, Jr.
BY Cushman, Darby & Cushman
ATTORNEY Patented June 5, 1951

2,556,052

UNITED STATES PATENT OFFICE 2,556,052

DIVERTER LIGHTING SYSTEM

Charles Adler, Jr., Baltimore, Md.

Application October 16, 1950, Serial No. 190,425

1 Claim. (Cl. 240—7.1)

The present invention relates to improved means for decreasing the hazard of vehicular travel at night. The invention is preferably employed in connection with the conventional sealed beam headlight systems now in use generally upon motor vehicles and in the course of night driving is operated automatically by a driver upon shifting from high beam to low beam in the face of the headlights of approaching and passing vehicles.

Night driving is suddenly and at irregular intervals punctuated by the headlights of an approaching car or series of cars and the variations so produced subject the eyes of a driver to constant strain, resulting in fatigue. It is the primary object of the invention to so balance the illumination that these contrasts occasioned by night driving are substantially reduced. This is accomplished by utilizing a diverter light which brilliantly illuminates an elongated transverse area on the roadway immediately in advance of the front of the vehicle but at a point readily visible to the normal gaze of the driver and extending from about the center line of the path of the vehicle to and beyond the right border of the roadway. The visible intensity on the roadway of this transverse illuminated area provided by the diverter light is greater per unit area than the intensity of the illumination provided by the low beam road illuminating means of the sealed beam system and positively attracts or diverts the eyes of the driver of the vehicle from the headlights of approaching and passing cars. This is due to the fact that the transverse area produced by the diverter light is closer to the eyes of the driver and is comparatively smaller and more concentrated than is the case with the low beam illumination. The low beam illumination not only is on the roadway further from the eyes of the driver, but presents a low visible intensity, as stated, because of the greater area covered by the sealed beam lens and its position.

The balance or diversionary effect produced by this invention does not, in any way, interfere with or detract from illumination required to permit a driver to proceed safely. On the contrary, the bright stripe or band is superimposed on the roadway upon the beam pattern of the low beam of the sealed beam system and forms a continuation thereof toward the driver of the automobile, so that the illumination is both increased in intensity and directed to a vital part of the highway and highway border.

The present invention has been tested and examined by the State of Maryland and has been approved by the State for installation on motor vehicles over which it has jurisdiction because of the greatly improved safety factor which it provides for night driving. It was found that not only does the invention increase the comfort and safety afforded the driver of a car going in one direction, but, of equal importance, no glaring effect is produced upon the eyes of drivers of vehicles approaching and passing in the opposite direction.

The invention will be more completely understood by reference to the drawings, wherein:

Figure 1 is a front elevation showing the diverter light attached to the right front bumper guard of an automobile;

Figure 2 is a diagrammatic view of a circuit including the diverter light and indicating the manner in which the diverter light is automatically energized and de-energized by operation of the switch for changing the headlight system from high beam to low beam and vice versa, the diverter light being only energizable upon operating the switch to change from high to low beam; this view also shows a switch for cutting out the diverter light completely when it is not desired to use the same on brightly lighted city streets in congested areas;

Figure 3 is a diagrammatic view of the beam pattern projected on the roadway from the low beam of the normal sealed beam light system and also showing the elongated beam pattern projected on the roadway by the diverter light which, it will be noted, is of greater intensity per unit area and is superimposed upon the transverse portion of the low beam illumination to the right of the path of the vehicle and forms a continuation of the low beam pattern toward the vehicle on which the diverter lamp is used;

Figure 4 is an elevational view of the conventional lens used in the sealed beam system of headlights, which lens has both vertical and transverse prisms so as to obtain greater horizontal spread as well as project the beam downwardly upon the roadway; and Figure 5 is an elevation of a lens having vertical prisms which is preferred for the diverter light so that it will form a transverse elongated beam pattern on the road and road border.

In the present sealed beam headlight systems when the low beam is energized, the beam pattern, as shown in Figure 3, is in the form of an inverted T, having a transverse area LB extending from the center line of the roadway R in the path of a vehicle to the right border or edge of the roadway and having legs extending away from the front of the vehicle, as shown at T. This beam pattern on the roadway does not provide any diversion for the driver who will continuously, unconsciously, have his gaze attracted to the headlights of approaching and passing vehicles. In accordance with the present invention, a contrastingly brighter transverse area D is presented on the roadway R in the path of travel of the car transversely of the roadway. This transverse area D extends from about the center line of the path of travel of the car to the right border or edge of the roadway and preferably beyond the same, as shown in Figure 3, and is superimposed partially on the area LB and forms a continuation thereof toward the front of the vehicle. This transverse and brightly illuminated area D on the roadway at the right side of the path of travel of the vehicle thereon is as close to the vehicle as possible to permit the driver always to see the same and have his attention focused upon it without altering his normal driving position. At the same time, the driver can see the headlights of approaching and passing cars, but without developing the heretofore objectionable eye strain and fatigue. This is due to the counter-balance effect created by the brightly illuminated transverse area D and its relative position on the roadway R. The illuminated area D extends well to the right from the center line of the path of travel of the vehicle on the roadway at least a sufficient distance to enable the driver to locate his position with respect to the (right) lane in which he is travelling.

The diverter lamp which produces the contrastingly brighter transverse area D is indicated at 10 and is located at the front of the vehicle 11 which has the usual sealed beam system of headlights indicated at 12. Preferably, the diverter light 10 is positioned on the right front bumper guard 13 at a point between the center line of the vehicle and the right outer extremity of the same, as shown. Also, the diverter light 10 is preferably positioned below the headlights 12, but this is not necessary so long as the beam pattern projected upon the roadway from the diverter light 10 has the desired intensity greater than that of the normal beam pattern projected upon the roadway by the low beam and is positioned relative to the front of the vehicle and the low beam illumination as illustrated in Figure 3, where it is always visible to and can attract the eyes of the driver of the vehicle.

Referring to Figure 2, the usual vehicle lighting circuit is illustrated having a switch 14—HB for energizing the headlight system and a switch 15—LB for changing from high beam to low beam. The diverter light 10 is connected into the system in parallel with the low beam circuit, as shown, so that when the low beam is energized or de-energized, the diverter light is energized or de-energized. Particularly as shown, it will be noted that the diverter light can only be operated when the switch 15—LB is actuated to change from high beam to low beam and vice versa. A switch 16D is employed to completely cut out of the circuit the diverter light 10 as, for instance, when driving on brightly lighted city streets.

Referring to Figure 4, there is disclosed the usual headlight lens employed in the sealed beam system, i. e., in the headlights 12, and it will be noted that there are both horizontal prisms 17 to direct the beams downwardly upon the roadway and vertical prisms 18 to spread the light transversely with respect to the roadway. The illumination obtained from such lens is indicated at LB—T in Figure 3 and because it is spread horizontally or laterally and is projected further on the roadway from the eyes of the driver and the front of the vehicle, produces a lower intensity illumination on the roadway than that produced by the lens of the diverter light 10. That is, referring to Figure 5, the lens of the diverter light 10 has mainly vertical prisms 19 to project an elongated transverse beam upon the roadway and is located closer to the eyes of the driver and the front of the car, so as to produce a more intense elongated transverse beam D than that produced from the normal low beam illumination as indicated.

Referring to Figure 1, the diverter lamp 10 is mounted on the vehicle so as to be vertically and horizontally adjustable in order to project the beam of light upon the roadway, as shown at D in Figure 3. Any suitable type of adjustable mounting may be employed, as, for example, a universal joint or a combination of a vertical shaft and a horizontal shaft mounting.

I claim:

The combination with a vehicle having an external lighting system including high and low beam roadway illumination means, a diverter light for the driver adjustably mounted on the front of the vehicle below said roadway illumination means and electrically connected to the lighting system for energization and de-energization with the low beam illumination means and having a lens arranged to produce an elongated beam pattern transversely on the roadway immediately in advance of the front of the vehicle but at a position readily visible to the normal gaze of the driver, said lens having a prism structure to refract said elongated transverse beam pattern upon the roadway from substantially the center line of the path of the vehicle laterally to the right of the center line to a point well beyond the side of the vehicle and to the right of the driver whereby substantially the entire elongated beam pattern is refracted on the roadway to the right of the center line of the vehicle, said illuminated transverse beam pattern being partially superimposed upon the illuminated area of the roadway produced by the energization of said low beam road illumination means and extending rearwardly therefrom toward the vehicle.

CHARLES ADLER, Jr.

REFERENCES CITED

The following references are of record in the file of this patent:

UNITED STATES PATENTS

| Number | Name | Date |
|---|---|---|
| 1,448,636 | Montague | Mar. 13, 1923 |
| 1,471,668 | Lyndon | Oct. 23, 1923 |
| 2,417,501 | Johnston | Mar. 18, 1947 |